United States Patent [19]

Strickler

[11] Patent Number: 4,461,364
[45] Date of Patent: Jul. 24, 1984

[54] FLEXURE COUPLING MEMBER FOR PRECISION WEIGHING APPARATUS

[75] Inventor: Ernst Strickler, Wolfhausen, Switzerland

[73] Assignee: Mettler Instrumente AG, Greifensee, Switzerland

[21] Appl. No.: 391,994

[22] Filed: Jun. 25, 1982

[30] Foreign Application Priority Data

Sep. 2, 1981 [CH] Switzerland ............ 5636/81

[51] Int. Cl.³ ............................................. G01G 21/24
[52] U.S. Cl. ............................. 177/255; 177/DIG. 9
[58] Field of Search ................. 177/210 EM, 212, 229, 177/DIG. 9, 225, 255

[56] References Cited

U.S. PATENT DOCUMENTS 3,734,218  5/1973  Kupper ................ 177/DIG. 9
3,779,072 12/1973  Meier ....................... 13/141 R
4,280,577  7/1981  Kunz ...................... 177/212 X

FOREIGN PATENT DOCUMENTS 2448554 11/1974 Fed. Rep. of Germany .

Primary Examiner—Joseph W. Hartary
Attorney, Agent, or Firm—Laubscher, Philpitt & Laubscher

[57] ABSTRACT

A flexure or bending coupling member (10) is disclosed for precision scales and the like, including a pair of clamping end portions (12) joined with a central bar portion (18) via a pair of flexure portions (15), characterized in that the bar portion is arranged normal to the plane containing the end portions and the bending axes of the flexure portions. The central bar portion is connected with the flexure portions (15) via twisted portions (20) rotated 90° about the longitudinal axis of the flexure coupling member, thereby affording improved resilience in the lateral direction and greater insensitivity regarding dimensional inaccuracies at the clamping locations and/or with respect to temperature variations.

6 Claims, 4 Drawing Figures

FLEXURE COUPLING MEMBER FOR PRECISION WEIGHING APPARATUS

BRIEF DESCRIPTION OF THE PRIOR ART

The present invention relates generally to a flexure or bending coupling member for use in high precision weighing apparatus and the like, including a pair of end portions, a central bar portion, and a pair of flexure portions connecting the central bar portion with the end portions, respectively, the flexure portions having parallel bending axes.

Such flexure coupling members are well known in the precision weighing apparatus art, as shown by the prior U.S. Pat. No. 3,779,072 to Meier and No. 4,280,577 to Kunz. They are generally used for transmitting force between a load receiver and a transmission lever, especially in small travel weighing apparatus (such as weighing apparatus of the electromagnetic load compensation or vibrating string types).

Bending couplings of the kind considered here have bending portions with the smallest possible spring constant as well as with bending axis that should be defined as accurately as possible, whereby meeting this requirement becomes all the more important, the greater the requirements for the scale are regarding measurement accuracy and read-out resolution. Of course, the bending portion must be strong enough to be able reliably to transmit the anticipated transmitted forces in the longitudinal direction of the coupling. Moreover, the bending coupling should also be in a position to absorb clamping moments from the fastening point, and it should be able to withstand minor dimensional errors in the structural components and shifts arising from temperature variations—all of this without producing any locking and thus any deteriorations in the weighing accuracy.

To meet these requirements and to achieve the largest possible felxibility also in the lateral direction, it has been proposed to provide a universal cross joint arrangement (as taught by the Meier U.S. Pat. Nol 3,779,072), or at least to provide a taper in the lateral direction, such a it is known from the U.S. Pat. No. 4,280,577 to Kunz, but also such as is disclosed for the guide means of a lever sysem of a scale in German Published Patent Application No. 24 48 554.

Measures of the kind just mentioned however were not satisfactory. If the spring constant of the taper in the lateral direction is greater than that of the (main) bending joint, then the bending hardness in the lateral direction will be too great—i.e., lateral forces or moments result in a locking or sticking of the coupling. If the spring constant of the taper in the lateral direction on the other hand is equal to or smaller than that of the (main) bending portion, then too much softness is obtained also in the main bending direction, whereupon a load-[stress]-dependent shift in the main bending line is obtained which in turn results in nonlinearities. Finally, if the spring constant in the lateral direction is smaller, the loadability in the traction or pressure direction becomes too small.

SUMMARY OF THE INVENTION

In order to avoid the above and other drawbacks of the flexure couplings of the prior art, it was proposed to devise a flexure coupling which, along with sufficient force resistance in the longitudinal direction, would combine a small spring constant of the (main) bending joint with great resilience in the lateral direction, without any shifts in the bending line and/or locking which would impair the scale weighing function and which would result from lateral stresses.

Accordingly, a primary object of the invention is to provide a flexure coupling member in which the central bar portion extends normal to the longitudinal plane containing the end portions and bending axes of the coupling member—i.e., the smaller dimension of the central bar portion extends parallel to the bending axes of the flexure coupling member. This design assures that the bar will act in the lateral direction as a bending spring whose spring constant—depending upon the length of the bar—can be kept very small, so that the desired resilience in the lateral direction can be achieved without any disturbing side effects (the bending hardness of the bar in the plane of the axes of the bending joint is smaller than in a direction lateral thereto).

In a preferred design, at least the bar and the clamping ends contain identical material thicknesses. Here it is a good idea between the bar and the clamping points to provide in each case a twist by 90°. This design offers the advantage of particularly simple manufacture, whereby one can use sheet metal strips consisting of suitable material.

The twists are preferably arranged between the bar and the bending portions. In this way the bending segment is clearly delimited in the lateral direction and is confined to the sector between the two main bending portions.

At least in case of higher resolutions of the scale, it is preferable that material thickness at the bending joint is reduced. With suitable, preferably non-cutting shaping methods, one can thus rather accurately achieve the desired low spring constant as well as a clearly positioned bending line.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
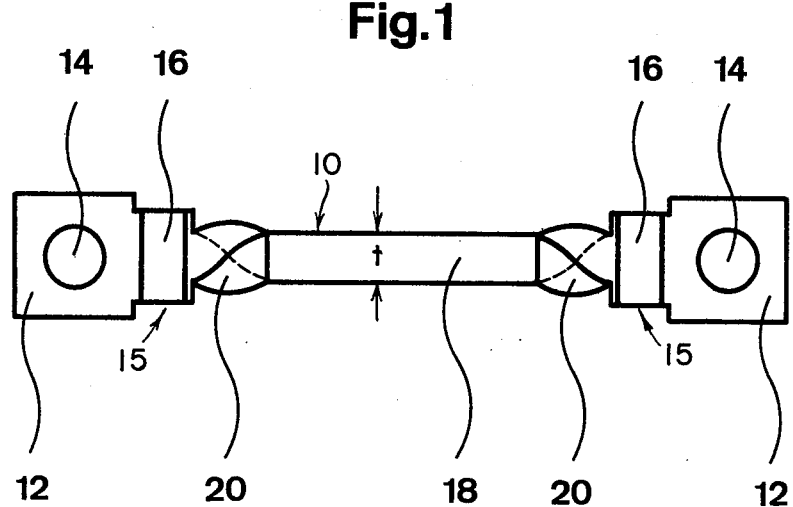
FIGS. 1 and 2 are top plan and side elevational views, respectively, of the flexure coupling member of the present invention.
Figure 2:
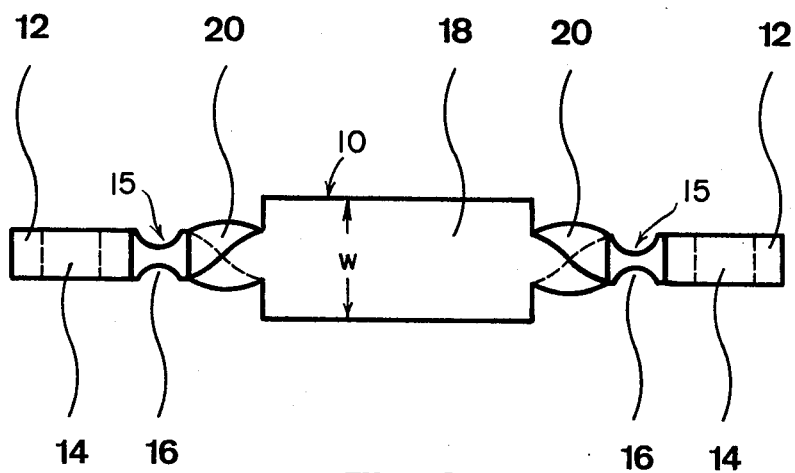

In the illustrated embodiment of FIGS. 1 and 2, the flexure coupling member 10 of the present invention is formed from a metal strip of constant thickness, for example, a material having a modulus of elasticity that is relatively insensitive to temperature fluctuations. The coupling member includes a pair of clamping end portions 12 containing fastening apertures 14, and a pair of flexure portions 15 having parallel bending axes that extend normal to the longitudinal axis of the coupling member. The flexure portions are defined by opposed pairs of grooves 16 of symmetrical arc-shaped configuration, which afford the desired low spring constant of the flexure joint.

The flexure coupling member includes a central bar portion 18 of non-cirular transverse cross-section. In the illustrated embodiment, the central bar portion has a rectangular cross-sectional configuration, the shorter dimension t (FIG. 1) of which extends parallel with the bending axes 16 of the flexure portions 15, and the longer dimension w (FIG. 2) of which extends normal to the bending axes. Thus, the plane which contains the central bar portion 18 extends normal to the plane that contains the end portions 12 and the bending axes of the flexure portions 15. Intermediate the ends of the central bar portion 18 and the flexure portions 15 are a pair of twisted portions 20 defined by twisting the material through an angle of 90° about the longitudinal axis of the flexure member. The original thickness of each of these twisted portions corresponds with that of the original sheet material from which the flexure coupling member is formed.

The flexure coupling member 10 is manufactured by means of customary techniques. Thus, the blank from which the member is formed is punched from sheet metal stock, and the arcuate grooves 16 defining the bending axes are formed by stamping. The end portions 12 are clamped in place, whereupon the rectangular bar portion 18 (having a rectangular transverse cross-sectional configuration) is twisted through an angle of 90° relative to the flexure portions 15 and the end portions 12. The finished coupling member may then be tempered or heat treated, as desired.

Figure 3:
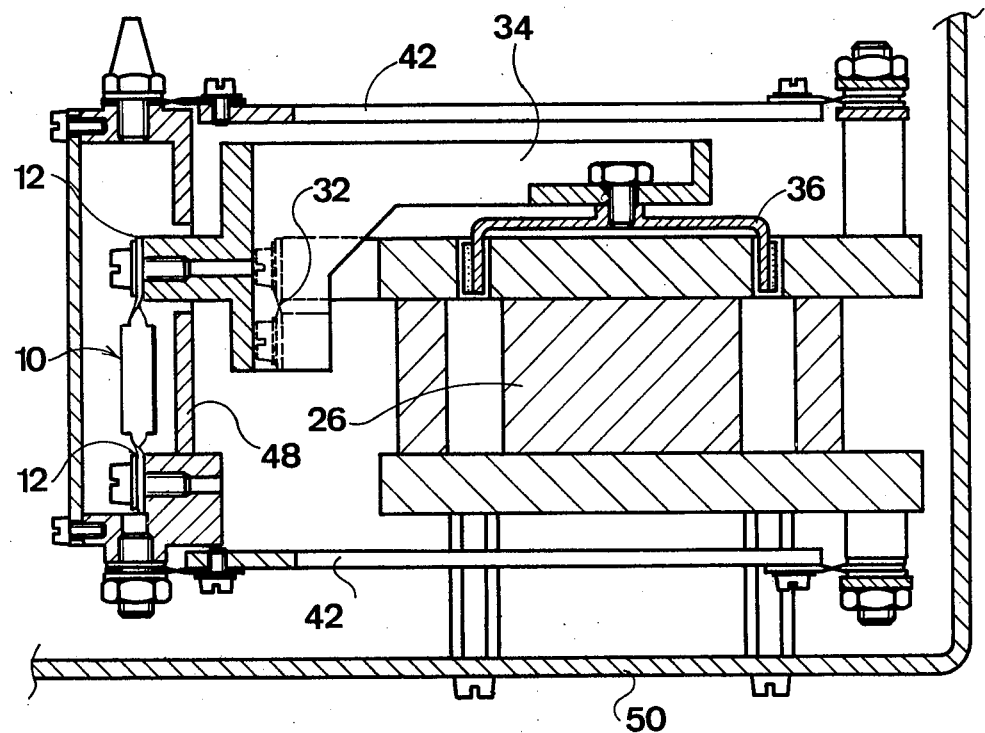
FIG. 3 is a sectional view of a weighing apparatus including the flexure coupling member of the present invention.

The coupling member 10 may be used to couple the moving components of a weighing apparatus, as shown in FIG. 3 (which corresponds with the weighing apparatus of the aforementioned Kunz U.S. Pat. No. 4,280,577). In this embodiment, a pair of elastic bending bearings 32 support a transmission lever 34 for pivotal movement about a horizontal pivot axis relative to the stationary permanent magnet 26. A conventional electromagnetic compensation coil 36 is connected with one end of the transmission lever 34, and at the other end, the pan carrier assembly 48 is supported from the transmission lever by the coupling member 10 of the present invention. The pan carrier assembly 48, in turn, is guided for vertical movement relative to the housing 50 by the pair of triangular-shaped upper and lower guide members 42, as is known in the art.

While the flexure coupling members 10 of the present invention are specifically designed for coupling the movable components of precision weighing apparatus and the like, it is apparent that they may be used in similar coupling applications.

Figure 4:
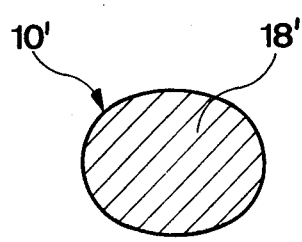
FIG. 4 is a sectional view of the central bar portion of another embodiment of the flexure coupling member.

In addition to the manufacturing techniques outlined above, the flexure coupling could be formed from initially round stock that is formed —for example, by pressing—into the desired configurations. Thus, as shown in the modification illustrated in FIG. 4, the central bar portion 18' may be formed to have a flattened elliptical transverse cross-sectional configuration. While normally the flexure couplings have two clamping ends, it may be desired to provide more such ends (for example, three clamping ends in a V-shaped or U-shaped arrangement).

While, in accordance with the Patent Statutes, the preferred forms and embodiments have been illustrated and described, other modifications may be made without deviating from the inventive concepts set forth above.

What is claimed is:

1. A flexure coupling member operable to connect a pair of relatively movable components of a weighing apparatus, including an elongated unitary body member (10) formed of a resilient flexible material, said body member including
    (a) a pair of clamping end portions (12) arranged at opposite ends of said body member for clamping said body member between a pair of relatively movable weighing components;
    (b) a central bar portion (18); and
    (c) a pair of flexure portions (15) connected between said central bar portion and said clamping end portions, said flexure portions having parallel bending axes that extend normal to the longitudinal axis of said central bar portion;
    (d) said central bar portion having in transverse cross-section a uniform non-circular configuration the shorter dimension of which extends parallel with said bending axes.

2. Apparatus as defined in claim 1, wherein said central bar portion has in transverse cross-section a rectangular configuration; and further wherein said clamping end portions have corresponding rectangular transverse cross-sections the thickness dimension of which corresponds with that of said central bar portion.

3. Apparatus as defined in claim 1, wherein each of said flexure portions (15) comprises a portion having a thickness that is less than that of said central bar and said clamping end portions.

4. Apparatus as defined in claim 1, wherein said central bar portion has in transverse cross-section the configuration of an ellipse.

5. A flexure coupling member operable to connect a pair of relatively movable components of a weighing apparatus, including an elongated unitary body member (10) formed of a resilient flexible material, said body member including
    (a) a pair of clamping end portions (12) arranged at opposite ends of said body member for clamping said body member between a pair of relatively movable weighing components;
    (b) a central bar portion (18);
    (c) a pair of flexure portions (15) connected between said central bar portion and said clamping end portions, said flexure portions having parallel bending axes that extend normal to the longitudinal axis of said central bar portion;
    (d) a pair of twisted portions (20) arranged between the ends of said central bar portion and said clamping end portions, respectively, each of said twisted portions comprising a portion that is rotated through an angle of 90° about the longitudinal axis of said body member;
    (e) said central bar portion having in transverse cross-section a uniform non-circular configuration the shorter dimension of which extends parallel with said bending axes.

6. Apparatus as defined in claim 5, wherein said twisted portions are arranged between the ends of said central bar portion and said flexure portions, respectively.

* * * * *